US010810246B2

United States Patent
Mittal et al.

(10) Patent No.: US 10,810,246 B2
(45) Date of Patent: Oct. 20, 2020

(54) ONTOLOGY REFINEMENT BASED ON QUERY INPUTS

(71) Applicant: International Business Machines Corporation, Armonk, NY (US)

(72) Inventors: Ashish R. Mittal, Bangalore (IN); Diptikalyan Saha, Bangalore (IN); Karthik Sankaranarayanan, Bangalore (IN); Jaydeep Sen, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 15/823,275

(22) Filed: Nov. 27, 2017

(65) Prior Publication Data

US 2019/0163818 A1    May 30, 2019

(51) Int. Cl.
| | | |
|---|---|---|
| *G06F 16/36* | (2019.01) | |
| *G06N 5/02* | (2006.01) | |
| *G06F 16/33* | (2019.01) | |
| *G06F 40/30* | (2020.01) | |

(Continued)

(52) U.S. Cl.
CPC ........ *G06F 16/367* (2019.01); *G06F 16/3344* (2019.01); *G06F 40/216* (2020.01); *G06F 40/247* (2020.01); *G06F 40/30* (2020.01); *G06N 5/02* (2013.01)

(58) Field of Classification Search
None
See application file for complete search history.

(56) References Cited

U.S. PATENT DOCUMENTS

| 7,814,096 B1 * | 10/2010 | Roy ...................... G06F 16/951 707/721 |
| 9,747,390 B2 * | 8/2017 | Cooper .................. G06F 40/30 |
| 2007/0208693 A1 * | 9/2007 | Chang ..................... G06F 16/20 |

(Continued)

OTHER PUBLICATIONS

Balakrishna et al., "Semi-Automatic Domain Ontology Creation from Text Resources," Proceedings of the International Conference on Language Resources and Evaluation, LREC 2010, May 2010, pp. 3187-3194. www.lrec-conf.org/proceedings/lrec2010/pdf/627_Paper.pdf.

(Continued)

*Primary Examiner* — Mark D Featherstone
*Assistant Examiner* — Samuel C Sharpless, III
(74) *Attorney, Agent, or Firm* — James L. Olsen

(57) ABSTRACT

Aspects of the present disclosure relate to automated ontology refinement based on query inputs and provided feedback. A query input is received for an ontology. Features of the query input are analyzed, wherein analyzation includes determining syntactical and semantic characteristics of the features of the query input. Based on the determined syntactical and semantic characteristics, ontological elements are classified for each feature of the query input. The ontological element for each feature of the query input is then compared to a set of ontological elements of the ontology. Based on the comparison, a response to the query input is received, along with a request for feedback regarding the response. Feedback is then received regarding the response. Based on the feedback, the ontology is analyzed to determine at least one deficiency of the ontology. The ontology is then refined to correct the at least one deficiency.

17 Claims, 8 Drawing Sheets

(51) Int. Cl.
*G06F 40/216* (2020.01)
*G06F 40/247* (2020.01)

(56) References Cited

U.S. PATENT DOCUMENTS

| | | | | |
|---|---|---|---|---|
| 2012/0124478 | A1* | 5/2012 | King | G06F 16/90 715/738 |
| 2012/0303356 | A1* | 11/2012 | Boyle | G06F 17/2785 704/9 |
| 2013/0290366 | A1 | 10/2013 | Boyle et al. | |
| 2014/0280353 | A1* | 9/2014 | Delaney | G06F 17/278 707/794 |
| 2016/0140439 | A1 | 5/2016 | Adderly et al. | |
| 2017/0046329 | A1 | 2/2017 | Mirhaji | |
| 2018/0137424 | A1* | 5/2018 | Gabaldon Royval | G06N 5/022 |

OTHER PUBLICATIONS

Bedini et al., "Automatic Ontology Generation: State of the Art," University of Versailles Technical Report, Dec. 2007, pp. 1-15. bivan.free.fr/Docs/Automatic_Ontology_Generation_State_of_Art.pdf.

Boosheri et al., "A New Layer for Automatic Ontology Creation from Text by Using Linked Data and Implied Information," Semantic Web Journal—Interoperability, Usability, Applicability, Sep. 2011, pp. 1-6. www.semantic-web-journal.net/sites/default/files/swj187.pdf.

Cimiano et al., "Ontologies on Demand?—A Description of the State-of-the-Art, Applications, Challenges and Trends for Ontology Learning from Text," Information, Wissenschaft und Praxis, Pub-ID: 2497477, 57, 2006, pp. 315-320. https://pub.uni-bielefeld.de/download/2497477/2525192.

Saha et al., "ATHENA: An Ontology-Driven System for Natural Language Querying over Relational Data Stores," Proceedings of the VLDB Endowment, vol. 9, No. 12, Aug. 2016, pp. 1209-1220. www.vldb.org/pvldb/vol9/p1209-saha.pdf.

Wong et al., "Ontology Learning from Text: A Look Back and into the Future," ACM Computing Surveys (CSUR), vol. 44, No. 4, Article 20, Aug. 2012, pp. 1-36. stlab.istc.cnr.it/documents/kmdm1213/progetti/OL-from-text.pdf.

* cited by examiner

ONTOLOGY REFINEMENT BASED ON QUERY INPUTS

BACKGROUND

The present disclosure relates generally to the field of computer systems, and more particularly to ontology refinement in question/answer (Q/A) computing environments.

Ontologies are used to compartmentalize and relate representational knowledge. In the broadest aspect, an ontology is a domain representation. The domain representation includes concepts (e.g., actors playing roles in the domain), relations (e.g., relationships between concepts), and attributes (e.g., concept properties). Ontologies can be visually represented by a knowledge graph (KG), which illustrates the relations between concepts present in the ontology domain. Ontologies can be applied for information retrieval, such as Q/A systems.

SUMMARY

Aspects of the present disclosure relate to automated ontology refinement based on query inputs and provided feedback. A query input can be received for an ontology. Features of the query input can be analyzed, wherein analyzation includes determining syntactical and semantic characteristics of the features of the query input. Based on the determined syntactical and semantic characteristics, each feature of the query input can be classified into an ontological element. The ontological element for each feature of the query input can then be compared to a set of ontological elements of the ontology. Based on the comparison, a response to the query input can be received, along with a request for feedback regarding the response. Feedback can then be received regarding the response. Based on the feedback, the ontology can be analyzed to determine at least one deficiency of the ontology. The ontology can then be refined to correct the at least one determined deficiency.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
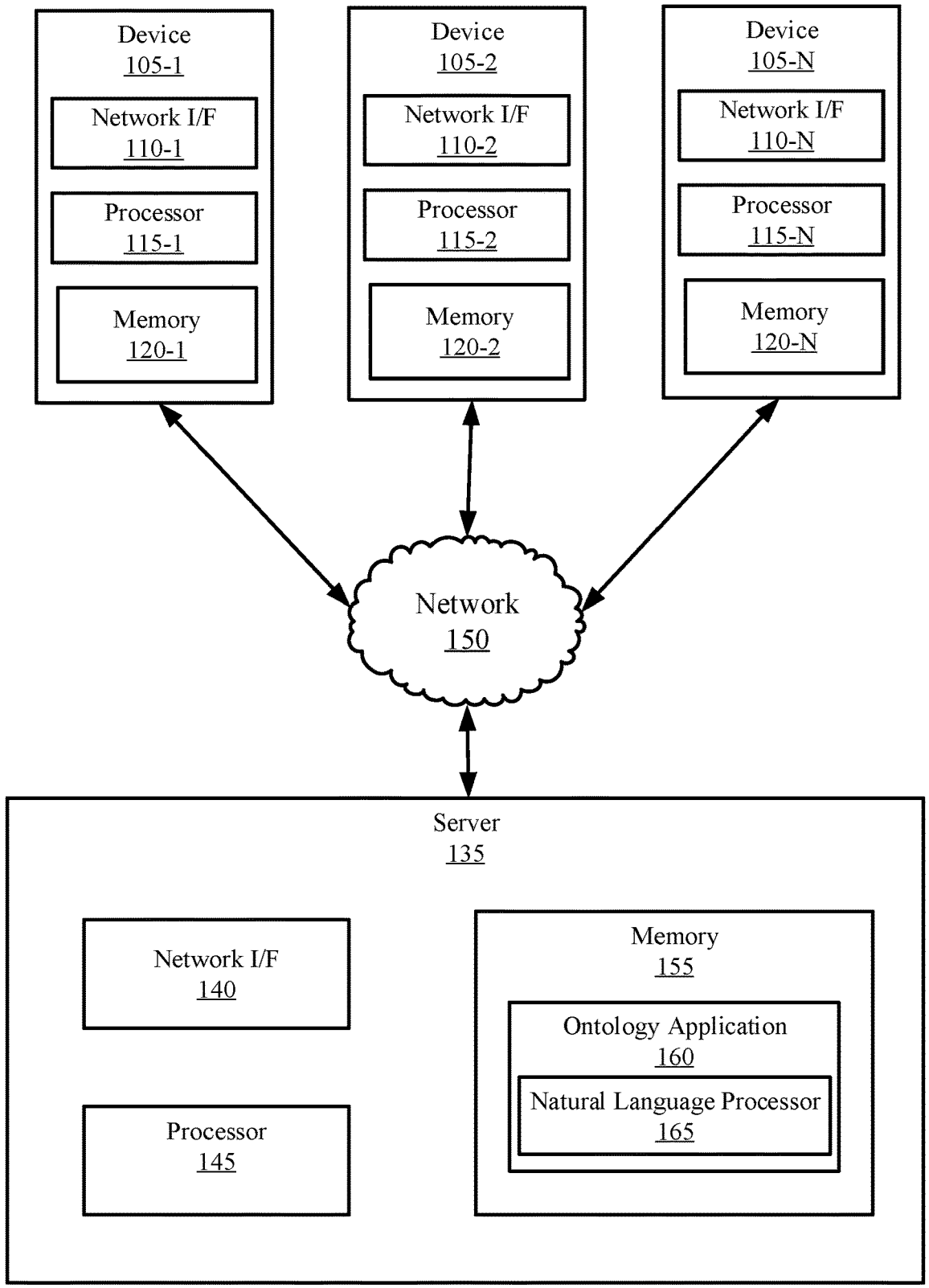
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to computer systems, and more particularly to ontology refinement in question/answer (Q/A) computing environments. While the present disclosure is not necessarily limited to such applications, various aspects of the disclosure can be appreciated through a discussion of various examples using this context.

Ontologies are used to compartmentalize and relate representational knowledge. Ontology domains include concepts (e.g., actors playing roles in the domain), functional relations between the concepts, and attributes indicating characteristics of the concepts. Ontologies can be visually represented by a knowledge graph (KG), which illustrates the relations (e.g., hierarchical and functional relations) between concepts present in the ontology domain. Ontologies can be applied in computing environments, to organize and interrelate data. Specifically, ontologies can be used for information retrieval, and may be used in Question/Answer (Q/A) systems.

Ontology learning (OL) is employed to automatically (or semi-automatically) generate ontologies from input data. OL includes extracting domain terminology, discovering concepts, deriving concept hierarchy, learning non-taxonomic relations, discovering aliases, and populating the ontology. The OL process begins with acquiring information needed to generate the ontology through domain terminology extraction. Various techniques can be used to pull data (e.g., structured, semi-structured, or unstructured data) from input sources, including natural language processing (NLP) techniques, clustering techniques, machine learning, etc. The input data is then analyzed (e.g., morphological analysis, lexical analysis, semantic analysis, hierarchical analysis, etc.) to properly organize and interrelate the extracted input data. Finally, the ontology is populated based on the analysis.

Though OL can accurately build ontologies based on provided input data, in Q/A systems, the constructed ontology is agnostic to an input question set. As a result, the ontology can be inaccurately constructed (e.g., incomplete or incorrect) to properly answer each question included in a question set. For example, the ontology can lack one or more concepts, relations, attributes, or aliases presented in the question set. In these situations, the ontology may not be able to provide an answer to the question(s), or alternatively, can provide an incorrect answer based on the one or more missing elements (e.g., concepts, relations, attributes, or aliases). Further, the initially constructed ontology may not be built to efficiently answer questions in the question set. In these examples, the ontology may be able to provide the correct answer to a given question, but may not be following an efficient logical path to retrieve the correct answer.

Additionally, the ontology can include extraneous information which is not relevant to the question set, which can occupy unnecessary memory and/or impede response efficiency.

Aspects of the present disclosure refine ontologies based on query inputs and provided feedback. Specifically, if one or more elements are addressed in a query input but not addressed in the ontology, aspects of the present disclosure can be configured to modify the ontology to include the missing elements. After the missing element(s) are added to the ontology, queries can be generated and transmitted to a feedback provider (e.g., a user or artificial intelligence (AI) entity) in order to verify the elements(s) are correctly situated (e.g., relationally and hierarchically organized) in the ontology. Based on responses to the queries by the feedback provider, the ontological organization (e.g., hierarchical and functional relationships) of the added element(s) can be modified.

Further, aspects of the present disclosure allow users to assert or negate the responses to the queries in order to refine the ontology. Based on the assertions or negations, various ontological refinement actions can be executed. For example, if an answer is asserted, the ontology can be analyzed to determine that the correct answer was efficiently retrieved. This can include determining whether the logical path executed to acquire the correct answer is condensable, and in response to a determination that the logical path is condensable, condensing the relational path to allow efficient information retrieval. Aspects of the present disclosure additionally enable pruning of extraneous elements in the ontology. Specifically, based on the query input, the ontology can be pruned to eliminate extraneous elements to reduce memory usage and/or improve answer retrieval.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 are configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 include optional input devices (e.g., a keyboard, mouse, scanner, video camera, or other input device), and/or any commercially available or custom software (e.g., browser software, communications software, server software, natural language processing software, search engine and/or web crawling software, filter modules for filtering content based upon predefined parameters, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes an ontology application 160. The ontology application 160 can be configured to refine an ontology (O) based on a query input and provided feedback. Devices 105 can transmit query inputs (e.g., a question or set of questions) over the network 150 to the ontology application 160. The ontology application 160 then receives the query inputs and provides responses (e.g., answer(s) to the question(s)) based on the ontology (O). The responses are then transmitted to the devices 105 over the network 150, along with a request for feedback (e.g., an assertion or negation regarding whether the answer was correct or incorrect) on the response. The devices 105 then provide feedback to the ontology application 160. Based on the query input and/or feedback provided to the ontology application 160, the ontology (O) is refined to generate a refined ontology (O').

In order to process the query input, the ontology application 160 includes a natural language processor (NLP) 165. The NLP 165 can be configured to process and analyze the query inputs provided by the devices 105. Various natural language processing techniques can be used (see FIG. 2) in order to process the query and compare it to corresponding elements (e.g., concepts, relations, attributes) in the ontology of the ontology application 160. Based on the comparison between the query input and the ontology, the ontology application 160 provides a response.

In some embodiments, the query input is processed with one or more methodologies as opposed to, or in addition to, natural language processing. These processing methodologies can include clustering methods, machine learning, term frequency-inverse document frequency (tf-idf), etc. In some embodiments, combinations of these methodologies are used to process input data provided to the ontology application 160.

In some embodiments, if the response is asserted as correct, the ontology application 160 can be configured to determine whether the logical path (e.g., relational/hierarchical path) followed to retrieve the correct response is condensable. Condensing the logical path followed in the ontology can improve information retrieval efficiency, and accordingly have benefits with respect to computing resources (e.g., bandwidth and memory usage can be reduced) associated with the ontology application 160. A determination that the logical path is condensable can be completed automatically. For example, in some embodiments, the system can determine the number of nodes (e.g., concepts) followed in order to retrieve the correct answer, and eliminate extraneous nodes taken such that the answer can still be accurately retrieved (e.g., by condensing the multiple relations between the multiple nodes into a single relation between two nodes).

If the response is asserted as incorrect, in some embodiments, the ontology application 160 is configured to analyze the ontological structure and determine at least one deficiency with the ontology (O). Determining deficiencies in the ontology (O) can be completed according to the query input. For example, if an alias for a relation present in the query input is missing from the ontology, the ontology application 160 can determine the possible counterpart alias in the ontology (O) (e.g., via a language model analysis completed by the NLP 165). After this prospective repair is identified, the ontology (O) can be refined to mirror the changes, generating a modified ontology (O'). A query can then be generated based on the modified ontology (O') and be provided to the devices 105 (e.g., the feedback provider) in order to determine whether the modified ontology (O') is accurate. Based on the feedback provided, the ontology (O') can either be finalized (e.g., the change is accepted) or reverted (e.g., the change is rejected).

In some embodiments, the ontology application 160 response indicates that the query input is unanswerable. In these embodiments, the ontology application 160 may not initially request feedback from the devices 105, but instead can extend the ontology (O) in order ensure the query input is answerable by the ontology application 160. This can include integrating elements present in the query input into the ontology, and requesting feedback thereafter. For example, if an element (e.g., concept, relation, attribute, alias, etc.) addressed in the query input is not present in the ontology (O), the ontology application 160 can refine the ontology in order to add the element and its correct relationships in the ontology. The ontology application 160 can then provide queries regarding the new element(s) added to the ontology to the devices 105 in order to validate that the element is correctly situated in the ontology (e.g., the ontology is hierarchically and relationally accurate).

In some embodiments, the feedback provider (e.g., device 105-2) can be an artificial intelligence (AI) entity. That is, in some embodiments, an AI entity can provide feedback (e.g., assertions or negations regarding the queries) to the ontology application 160. However, in some embodiments, users accessing the devices 105 can provide feedback. In some embodiments, a feedback provider can reference another ontology or other relational database to assert or negate responses generated by the ontology application 160.

In some embodiments, if the same query is transmitted by all devices 105, the ontology application 160 can request feedback from each of the devices 105. This enables cross-referencing the feedback provided by each of the devices 105. For example, if device 105-1 transmits user provided feedback, and device 105-2 transmits AI provided feedback, the feedback provided by devices 105-1 and 105-2 can be cross-referenced against each other in order to ensure the feedback is accurate. This can be completed for any number of devices 105-N (or for any number of feedback instances).

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
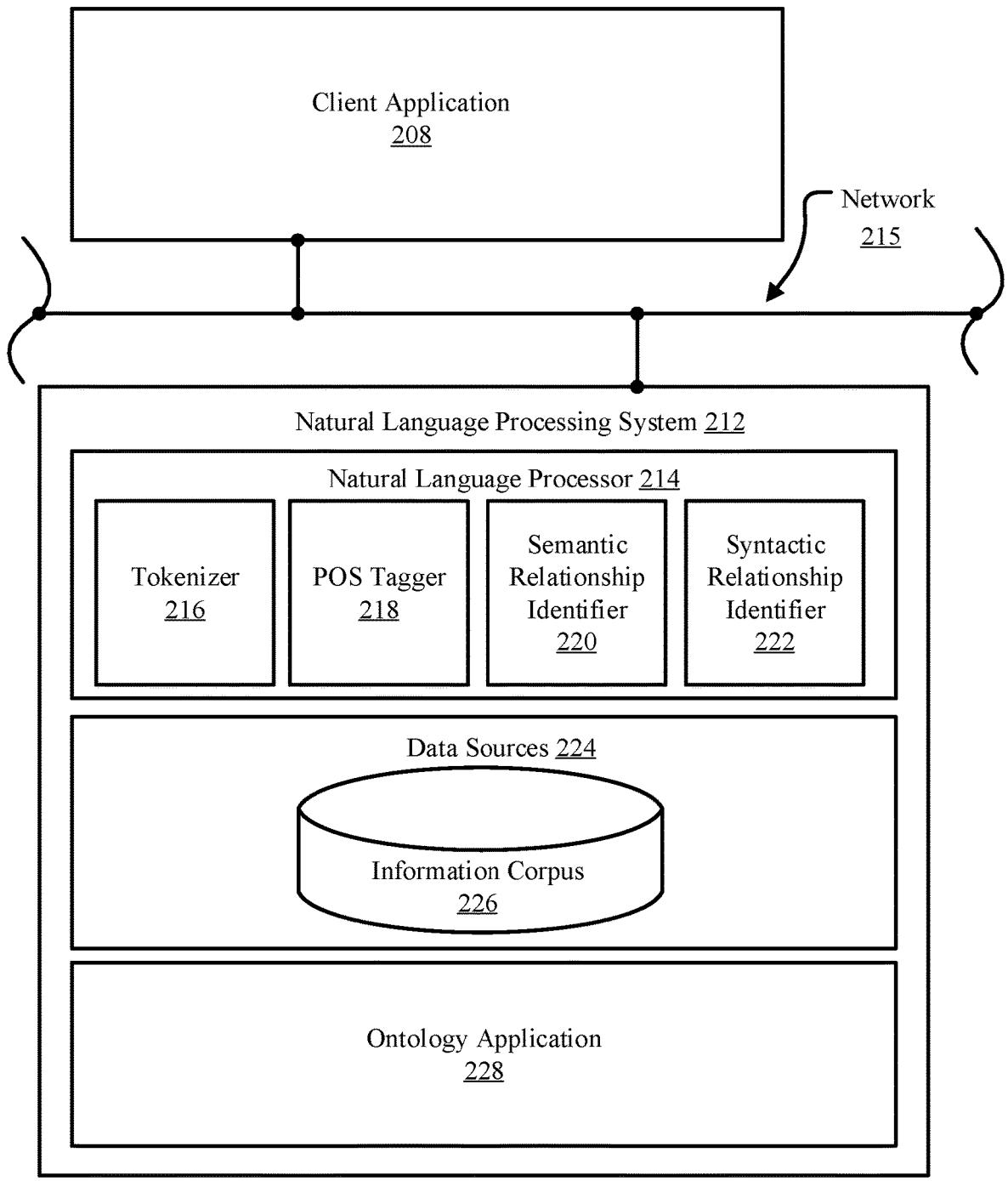
FIG. 2 is a block diagram illustrating a natural language processing system configured to process unstructured data inputs, in accordance with embodiments of the present disclosure.

Turning now to FIG. 2, illustrated is a block diagram of an example natural language processing system 200 configured to process unstructured data inputs (e.g., unstructured text documents), in accordance with embodiments of the present disclosure. In some embodiments, a remote device (e.g., device 105-1 of FIG. 1) can submit input data to be analyzed by the natural language processing system 212, which can be a standalone device, or part of a larger computer system (e.g., included in ontology application 160 of FIG. 1). Such a natural language processing system 212 can include a client application 208, which can itself involve one or more entities operable to generate or modify unstructured input data that is then dispatched to a natural language processing system 212 via a network 215.

Consistent with various embodiments, the natural language processing system 212 can respond to electronic document submissions sent by a client application 208. Specifically, the natural language processing system 212 can analyze a received unstructured data input (e.g., electronic encyclopedia, electronic dictionary, scientific report, electronic document containing a query input, etc.) and prepare the unstructured data input for ontology generation and/or refinement. This can include processing the unstructured data input such that it can be readily integrated into the ontology (e.g., by identifying and tagging potential concepts, attributes, and relations).

The natural language processor 214 (e.g., natural language processor 165 of FIG. 1) can be a computer module that analyzes the received unstructured input data. The natural language processor 214 can perform various methods and techniques for analyzing electronic documents (e.g., syntactic analysis, semantic analysis, etc.). The natural language processor 214 can be configured to recognize and analyze any number of natural languages. In some embodiments, the natural language processor 214 can parse passages of the documents. Further, the natural language processor 214 can include various modules to perform analyses of electronic documents. These modules can include, but are not limited to, a tokenizer 216, a part-of-speech (POS) tagger 218, a semantic relationship identifier 220, and a syntactic relationship identifier 222.

In some embodiments, the tokenizer 216 can be a computer module that performs lexical analysis. The tokenizer 216 can convert a sequence of characters into a sequence of tokens. A token can be a string of characters included in an electronic input document and categorized as a meaningful symbol. Further, in some embodiments, the tokenizer 216 can identify word boundaries in an electronic document and break any text passages within the document into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module that marks up a word in passages to correspond to a particular part of speech. The POS tagger 218 can read a passage or other text in natural language and assign a part of speech to each word or other token. The POS tagger 218 can determine the part of speech to which a word (or other text element) corresponds, based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the natural language processing system 212 can populate a text index, a triple store, or a relational database (RDB) to enhance the contextual interpretation of a word or term. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing system 212.

In some embodiments, the semantic relationship identifier 220 can be a computer module that can be configured to identify semantic relationships of recognized text elements (e.g., words, phrases) in documents. In some embodiments, the semantic relationship identifier 220 can determine functional dependencies between entities and other semantic relationships.

Consistent with various embodiments, the syntactic relationship identifier 222 can be a computer module that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 can be a computer module that can parse a document and generate corresponding data structures for one or more portions of the document. For example, in response to receiving an unstructured textual report at the natural language processing system 212, the natural language processor 214 can output parsed text elements from the report as data structures. In some embodiments, a parsed text element can be represented in the form of a parse tree or other graph structure. To generate the parsed text element, the natural language processor 214 can trigger computer modules 216-222.

In some embodiments, the output of natural language processor 214 can be used by an ontology application 228 (e.g., ontology application 160 of FIG. 1) in order to build an ontology. For example, if the natural language processor 214 populates a relational database (RDB) or triple store, the RDB or triple store can be used to identify (e.g., classify) concepts (e.g., subjects or objects), relationships (e.g., the relation between subjects or objects), attributes (e.g., characteristics of subjects or objects), and aliases (e.g., synonyms for concepts) to be integrated into an ontology. In some embodiments, the structured input data output by the natural language processor 214 can be integrated into an already populated ontology. In these embodiments, the structured data output by the natural language processor 214 can be compared to corresponding elements on the ontology, to properly extend the ontology to include the structured data.

Figure 3:
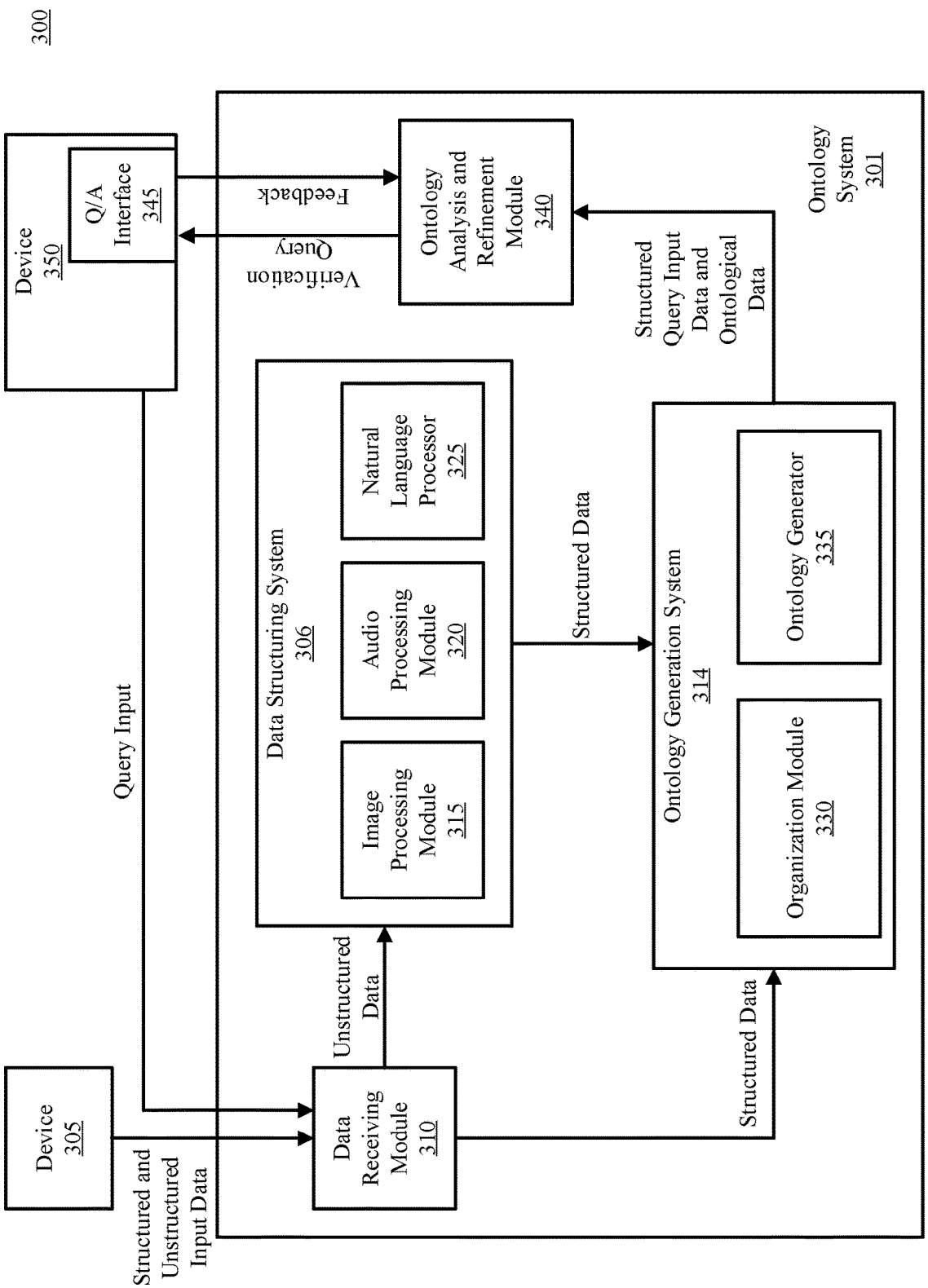
FIG. 3 is a block diagram illustrating an example computing environment including an ontology system, in accordance with embodiments of the present disclosure.

FIG. 3 is a block diagram illustrating an example computing environment 300 including an ontology system 301, in accordance with embodiments of the present disclosure. The computing environment 300 includes two devices 305 and 350 and the ontology system 301. The ontology system 301 includes a data receiving module 310, a data structuring system 306, an ontology generation system 314, and an ontology analysis and refinement module 340.

Consistent with various embodiments, the data receiving module 310 can be configured to receive input data from the devices 305 and 350. The device 305 (e.g., devices 105 of FIG. 1) can transmit various structured and unstructured data (e.g., text documents, videos, audio snippets, images, triple store formatted data, etc.) to the data receiving module 310. The device 350 (e.g., devices 105 of FIG. 1) can transmit query inputs (e.g., questions) to the data receiving module 310. However, in some embodiments, the structured and unstructured data, as well as input queries, are transmitted over a plurality of devices (e.g., in a distributed computing environment). The input data can be transmitted to the data receiving module 310 in any manner. For example, in some embodiments, input data is transmitted over a network (e.g., network 150 of FIG. 1 or network 215 of FIG. 2). The data can be received as pushed by the devices 305 and 350, or alternatively, can be requested as pulled by the data receiving module 310.

After the input data is received, it can be organized into a structured data portion and an unstructured data portion. The data receiving module 310 can include logic to differentiate between structured and unstructured data. For example, in some embodiments, the data receiving module only transmits triple store formatted data to the ontology generation system 314. After the data is organized into an unstructured and structured portion, the unstructured data portion of input data is transmitted to the data structuring system 306, and the structured data is transmitted to the ontology generation system 314.

The data structuring system 306 is configured to structure the unstructured data received from the data receiving module. The unstructured data can include pictures, videos, text documents, audio clips, images, etc. An image processing module 315, audio processing module 320, and natural language processor 325 (e.g., natural language processor 165 of FIG. 1 or natural language processor 214 of FIG. 2) are configured to structure the data.

The image processing module 315 is configured to extract language or text from image inputs. For example, the image processing module 315 can be configured to extract text from images (e.g., extract street sign text ("1$^{st}$ Avenue") from traffic images). Further, the image processing module 315, can, in some embodiments, be configured to generate text based on images (e.g., generate text "volcano" from an image of a volcano via image analysis). The extracted or generated text can then be transmitted to the natural language processor 325 such that the text can be structured.

The audio processing module 320 is configured to extract text from audio inputs. For example, for a given audio clip, the audio processing module can be configured to detect speech and convert the speech into text. The extracted text can then be transmitted to the natural language processor 325 to structure the text.

In some embodiments, the image processing module 315 and audio processing module 320 are configured to cooperatively process video inputs. For example, the audio processing module 320 can be configured to process audio from the video input, while the image processing module 315 can be configured to process frames of the video input. The data collected from the image processing module 315 and audio processing module 320 can then be transmitted to the natural language processor 325.

The natural language processor 325 receives unstructured textual input data (e.g., directly from data receiving module 310, or from processing modules 315 and/or 320), and structures the textual input data. In some embodiments, the textual input data is structured such that it can be easily integrated into an ontology. For example, the natural language processor 325 can be configured to analyze the unstructured input data, and format the unstructured input data for an organization module 330 on the ontology generation system 314. In some embodiments, the organization module 330 can require the data to be in a specific format (e.g., triple store), and the natural language processor can be configured to format (e.g., structure) the unstructured data accordingly. The natural language processor 325 can be configured to perform one or more of the natural language processing techniques described in FIGS. 1-2.

The ontology generation system 314 receives structured data from the data receiving module 310 and data structuring system 306. The structured data is first received by an organization module 330. The organization module 330 can be configured to analyze and process the structured data to indicate elements that will be integrated into the ontology. For example, the organization module 330 can be configured to receive the structured data (e.g., triple store data, OBO Foundry formatted data, W3C Web Ontology Language (OWL) formatted data, etc.), analyze the structured data to identify concepts, relations, and attributes, and process the input data such that an ontology generator 335 can build an ontology based on the input data. The organization module 330 can be configured to perform one or more methods used for ontology learning, including concept discovery, concept hierarchy derivation, functional relation (e.g., non-hierarchical relation) learning, rule discovery, etc. The ontology learning analysis can then be transmitted to the ontology generator 335 for ontology population.

The ontology generator 335 is configured to populate an ontology based on the input data received from the organization module 330. For example, based on the data received from the organization module, the ontology generator 335 augments an ontology with instances of concepts, relations (e.g., hierarchical relations and functional relations), attributes, and aliases. In some embodiments, the ontology generator references relational tuples to build attributes for the concepts included in the ontology. In some embodiments, the ontology generator 335 can be configured to generate a visual representation of the populated ontology, such a knowledge graph (KG). In some embodiments, the KG can be used by a domain expert to analyze the ontological structure.

After the ontology is generated by the ontology generator 335, the ontological data is transmitted to an ontology analysis and refinement module (OARM) 340. Further, structured query input data is also transmitted to the OARM 340 (e.g., though not illustrated, at a time after the ontology is initially populated). The OARM 340 can be configured to analyze the ontology based on the query input transmitted by device 350. For example, the OARM 340 can be configured add missing elements addressed in the query input but not addressed in the ontological data, prune extraneous elements from the ontological data, condense logical pathways in the ontology, and repair deficiencies in the ontology.

Based on the modifications to the ontology by the OARM 340, the OARM 340 can be configured to transmit verification queries to a Question/Answer (Q/A) interface 345 of the device 350. The verification queries can be directed to the recent modifications of the OARM 340, and be used to verify that the modifications were accurate. For example, if the OARM 340 adds a concept "Basketball" to its respective superclass, "Sport," the OARM 340 can generate a verification query to the Q/A interface 345 querying whether basketball is a sport (e.g., "Is basketball a sport?"). The Q/A interface 345 can then transmit feedback regarding the verification query. For example, following the above example "Is basketball a sport?", the feedback provided to the OARM 340 is "Yes." The OARM 340 then determines that the modification was accurate based on the assertion provided by the Q/A interface 345.

Though the Q/A interface 345 is illustrated as a part of the device 350, in some embodiments, the Q/A interface 345 can be included on the ontology system, or another device, such as device 305. In some embodiments, a user accessing the ontology system 301 can provide feedback directly on the ontology system 301. In some embodiments, feedback is acquired over a network (e.g., network 150 of FIG. 1).

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary.

Figure 4A:
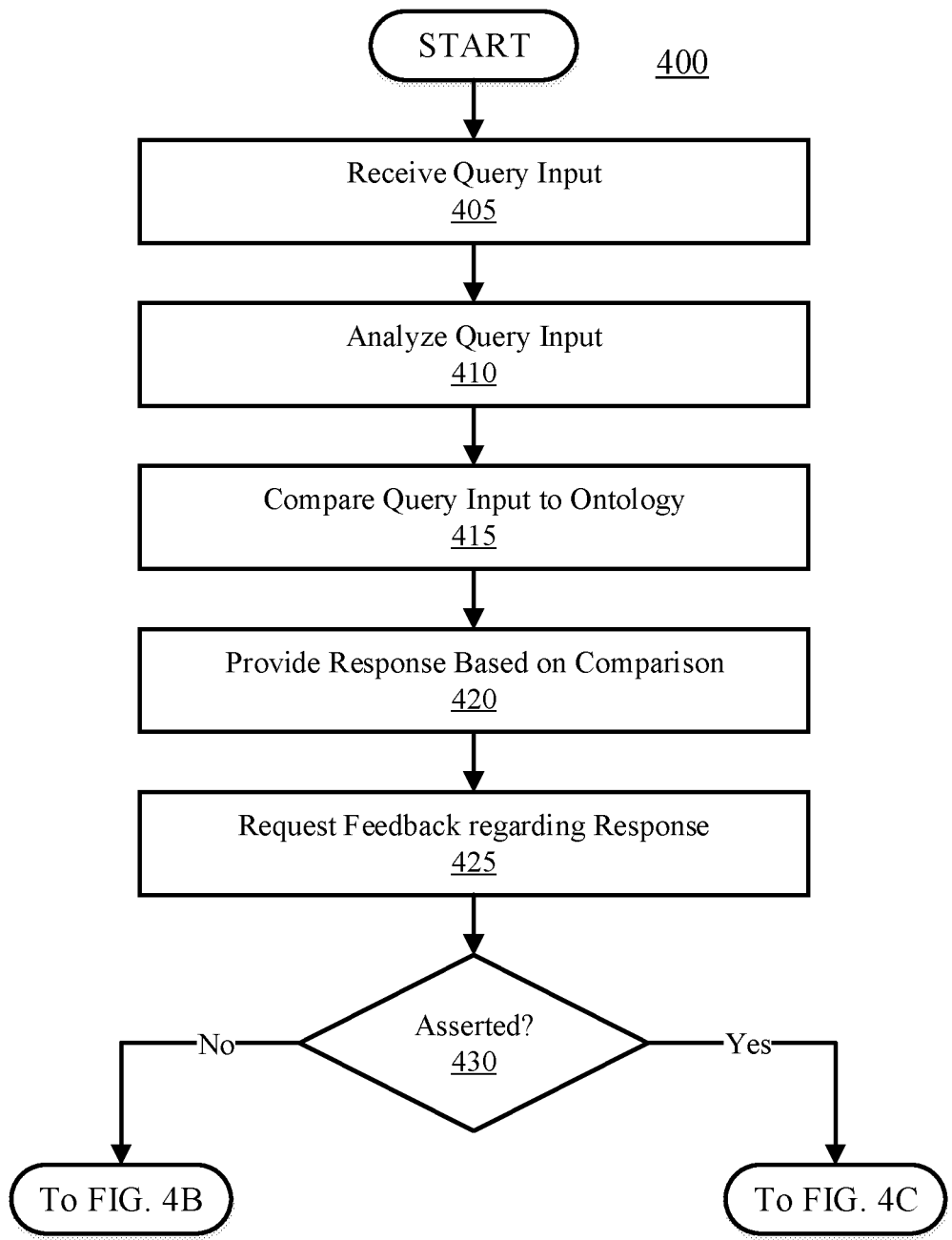
FIG. 4A, FIG. 4B, and FIG. 4C are flow diagrams collectively illustrating a process for refining an ontology based on a query input and provided feedback.
Figure 4B:
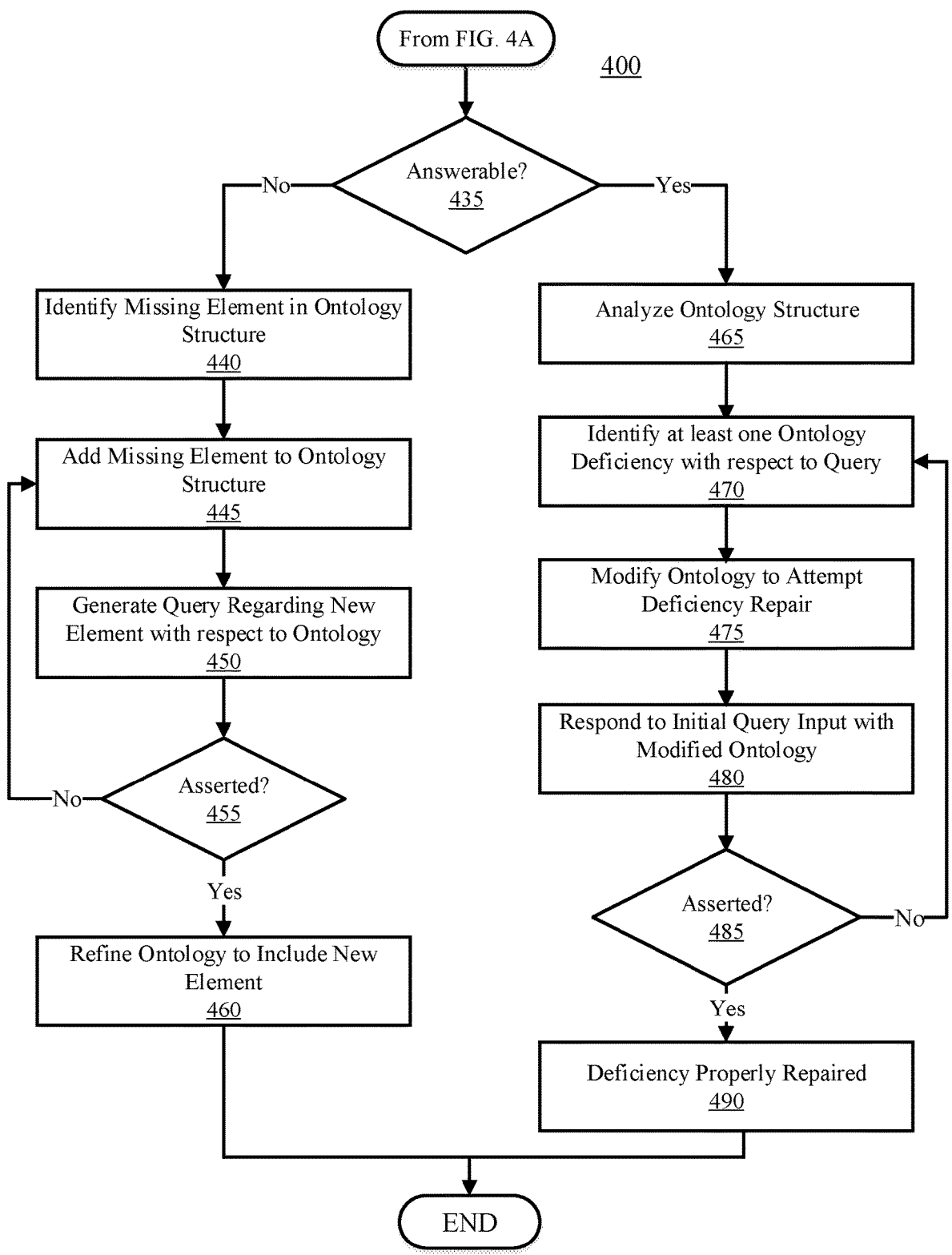
Figure 4C:
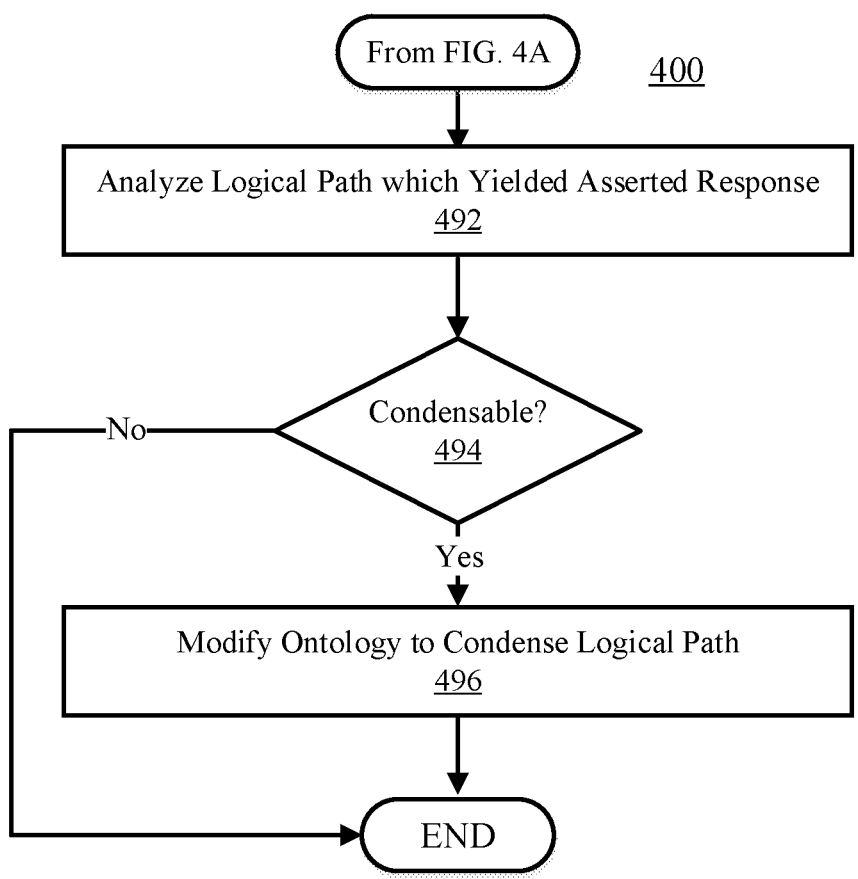

FIG. 4A, FIG. 4B, and FIG. 4C are flow diagrams collectively illustrating a process 400 for refining an ontology based on a query input and provided feedback. The connection between FIG. 4A, FIG. 4B and FIG. 4C is illustrated by reference to the preceding or following respective figure. Specifically, FIGS. 4B and 4C are continuations of FIG. 4A, all of which collectively illustrate process 400.

Process 400 starts by receiving a query input. This is illustrated at step 405. The query input can be a question or set of questions. The query input can be received in any manner. In some embodiments, the query input is received over a network. In some embodiments, the query input is received through a graphical user interface (GUI) or the like (e.g., on a device including an ontology application).

After the query input is received, the query input is analyzed. This is illustrated at step 410. In some embodiments, analyzing the query input can include structuring the query input (e.g., via natural language processor 165 or natural language processor 214). The query input can be structured into a format (e.g., via syntactical and semantic analysis of features of the query input) consistent with the ontology, such that the query input elements can be compared to corresponding elements (e.g., related or similar elements) present in the ontology. For example, analyzing the query input at step 410 can include formatting the query input into triple store (e.g., subject-predicate-object format). The formatted data can then be analyzed to determine its ontological characteristics (e.g., mapping a subject and object each to a concept, and the predicate to a functional relation between the two mapped concepts). However, analyzing at step 410 can include solely determining ontological features/placement for already structured data.

The query input can then be compared to the ontology. This is illustrated at step 415. The structured query input can be compared to elements present in the ontology. For example, if a given concept is indicated in the query input based on the analysis, the ontology can be analyzed to determine whether the same or similar (e.g., an alias) concept exists in the ontology. After a corresponding concept in the ontology is mapped to the concept identified in the query input, a functional relation (e.g., a relation between two concepts) element in the query can also be compared to a corresponding functional relation in the ontology. In some embodiments, comparing the query input to the ontology at step 415 can include interpreting the query over the ontology. Interpreting the query input over the ontology can include comparison of tokens (e.g., acquired via natural language processing) of the query input to the ontological elements. In some embodiments, each query input token can map to multiple ontological elements. After elements provided in the query input are compared and mapped to corresponding elements in the ontology, a logical path in the ontology can be identified to accurately retrieve a response to the query. In some embodiments, no corresponding elements are located in the ontology. In these embodiments, the ontology may not be able to answer (e.g., respond to) the query.

A response to the query input can be provided based on the comparison of the query input to the ontology. This is illustrated at step 420. As previously mentioned, the response depends on the comparison between the query input and the ontology. Based on the comparison between the query input and the ontology, a logical path in the ontology can be selected to provide a response to the query. As an example, if the query input included "How old is Barack Obama?", "Barack Obama" can be determined to be a concept of the query, and "Age" can be determined to be an attribute of the concept "Barack Obama" (e.g., based on a language model analysis via a natural language processor). The ontology can then be cross-referenced for the concept "Barack Obama" and the attribute "Age." Based on the data included in the ontology, the logical pathway followed is: "BarackObama→has→Age→value." The value of the age of Barack Obama can then be selected as the appropriate response, and can be transmitted to the input query provider. In this example, the response provided based on the comparison between the query input and the ontology at step 420 would be "X years old," where "X" is Barack Obama's current age.

In some embodiments, the response indicates that the query is unanswerable over the ontology. This response can be generated if the query includes elements not present in the ontology. In these embodiments, responses can include "Error Message: X," "Element Y not Found," "Question Z Unanswerable," "Error Retrieving Attribute F," etc. The indications provided with the response can allow the query input provider to appropriately repair the error with the ontology.

After the response is provided to the query input provider (e.g., the entity asking the question set), feedback regarding the response can be requested. This is illustrated at step 425. The feedback regarding the response can be requested in any manner. In some embodiments, the request is issued directly to the query input provider. However, in some embodiments, the feedback can be requested from another entity (e.g., an AI entity). In some embodiments, feedback can be requested from multiple sources to improve the accuracy of the feedback.

If the response is asserted at step 430, then process 400 proceeds to FIG. 4C, step 492 where the logical path which yielded the asserted response is analyzed. If the response is not asserted (e.g., negated or unanswerable), then process 400 proceeds to FIG. 4B, step 435, where a determination is made whether the query input is answerable.

Referring now to FIG. 4B, a determination is made whether the query input is answerable. This is illustrated at step 435. A determination regarding whether the query input is answerable can be completed in any manner. In some embodiments, a determination is made that the query input is not answerable if the response provided at step 420 indicates that the query input is unanswerable (e.g., see FIG. 4A). In some embodiments, a determination is made that the query input is answerable if the feedback received at step 425 indicates that the response was negated (e.g., that an answer was provided, but yielding an incorrect result).

If a determination is made that the query input is not answerable, the missing elements in the ontology that were present in the query input are identified. This is illustrated at step 440. Determining the elements missing from the ontology can be based on the comparison at step 415. For example, if a concept present in the query input is missing from the ontology as indicated by the comparison, the concept missing from the ontology can be identified as the missing element.

After the missing element is identified, the missing element is added to the ontology. This is illustrated at step 445. In some embodiments adding the missing element to the ontology can be based on the comparison between the query input and the ontology. In some embodiments, databases or domain experts can be relied upon in order to determine the appropriate ontological positioning of the added element. After the missing element is initially situated in the ontology, at least one query regarding the situation (e.g., ontological placement) of the missing element in the ontology is generated. This is illustrated at step 450. The at least one query can query specific relations between the added missing element and elements already present in the ontology to verify the accuracy of the ontology.

The generated queries can then be transmitted to a feedback provider (e.g., domain expert, AI entity, query provider, etc.) to receive an assertion or negation regarding the verification queries. This is illustrated at step 455. If the feedback provider asserts the at least one query, the ontology can be refined (e.g., finalized) to include the new element. This is illustrated at step 460. In some embodiments, if the feedback provider negates the at least one query, process 400 moves back to step 445, where the missing element is re-added to the ontology structure (e.g., in a different location). This can allow the missing element to be corrected placed in the ontology, and can include further verification.

As an example of a missing element scenario, if a query input: "What are the tourist places of the United States?" is received, and the ontology (O) does not include a concept "Tourist Place," "Tourist Place" is indicated as a missing element (step 440) Afterwards, the ontology (O) is extended to include "Tourist Place" (step 445). In this example, the concept "Tourist Place" is indicated as a subclass of the broader concept "Place" (e.g., based on a language model analysis, domain expert analysis, database reference, etc.). In some embodiments, "Tourist Place" can be validated as a subclass of "Place" by transmitting a query to the input provider (e.g., or another entity). For example, the query transmitted regarding the situation of "Tourist Place" can be: "Is a tourist place a place?" The feedback provider can then respond "Yes," to validate that "Tourist Place" is properly classified as a subclass of "Place."

After "Tourist Place" is added to the ontology as a subclass of "Place," queries can be generated regarding other subclasses of "Place" to determine their proper relation to "Tourist Place" (step 450). For example, if "Beach," "Mountain," "Government Headquarter," and "Private Property" are subclasses of "Place," queries can be generated regarding the relationships between "Tourist Place" and these subclasses. In this example, the queries generated include "Is a beach a tourist place?", "Is a mountain a tourist place?", "Is a government headquarter a tourist place?", and "Is private property a tourist place?". The queries are then transmitted to a feedback provider. In this example, the feedback provider responds "Yes" to the "Beach" subclass, "Yes" to "Mountain" subclass, "No" to the "Government Headquarter" subclass, and "No" to the "Private Property" subclass (e.g., step 455). The ontology (O) is then updated to mirror the provided feedback, generating a refined ontology (O') (step 460).

If it is determined that the query input is answerable at step 435, then process 400 proceeds to step 465, where the ontology structure is analyzed. Analyzing the ontology structure can include analyzing the portion of the ontology (e.g., the logic path) which yielded the incorrect response. Analyzing can include analyzation by a domain expert (e.g., a domain manager or AI entity) or comparison to other data (e.g., comparison to another relational database). Based on the analysis at step 465, at least one deficiency with the ontology is determined. This is illustrated at step 470. The ontology is then refined in an attempt to repair the determined deficiency. This is illustrated at step 475. Repairing the determined deficiency can depend on the analysis completed at step 465. For example, if the analysis indicates a functional relation as improper between two concepts, the relation can be repaired at step 475.

After the deficiency repair is attempted, a response is generated with respect to the initial query input. This is illustrated at operation 480. The response is provided to a feedback provider to determine whether the response is accurate (e.g., by allowing the feedback provider an opportunity to assert or negate the response). This is illustrated at step 485. If the feedback provider asserts the response as correct, then process 400 proceeds to step 490, where the repair is finalized, as the deficiency was properly repaired. In some embodiments, if the feedback provider negates the response as incorrect, then process 400 moves back to step 470, where another deficiency (e.g., causing the incorrect response) is identified. Alternatively, in some embodiments, if the feedback provider negates the response as incorrect, then process 400 moves back to step 475, in which a different repair attempt is issued.

As an example of a negated response, if a query input "What country is the origin of the Ganges River?" is received, and the ontology (O) is missing an alias "Origin," but includes "Mouth Place," the system can incorrectly retrieve the countries the Ganges River flows through rather than the mouth place or origin of the river (e.g., logic path: GangesRiver→FlowsThrough→Country). Accordingly, the feedback provider negates the response as incorrect, as all the countries which the Ganges River flows through are returned, rather than the country of origin. Afterwards, the ontology structure is analyzed (step 465) to determine the deficiency leading to the negated response. Based on the analysis (e.g., by a domain expert, AI entity, etc.), the missing alias "Origin" is identified as the at least one ontology deficiency with respect to the query (step 470). The ontology is then modified to attempt to repair the deficiency by adding "Origin" as an alias of "Mouth Place" (step 475). The initial query input is then responded to with the modified ontology (O'), which follows the logic path GangesRiver→Origin→Place→LocatedIn→Country, yielding a response "India" (step 480). Feedback is then requested for the new response, which is properly asserted, as the modified ontology (O') correctly answered the query (step 485). The deficiency is then determined to be properly repaired, based on the assertion by the feedback provider (step 490).

Referring now to FIG. 4C, if the feedback indicates an assertion that the initial query input was correct at step 430, then process 400 proceeds to step 492, where the logical path which yielded the asserted responses is analyzed. In some embodiments, the logical path which yielded the asserted response is analyzed to determine whether it is condensable. This is illustrated at step 494. In some embodiments, a plurality of nodes (e.g., concepts, attributes, etc.) are analyzed to determine whether there are extraneous nodes which are not required to provide a correct response to the query input. For example, if the logical path executed in order to retrieve the asserted response referenced 12 nodes (e.g., 12 concepts), and 2 nodes were not necessary to provide the asserted response, the logical path can be determined to be condensable. Condensing the logical path can include bypassing one or more nodes followed in order to retrieve the correct answer. In some embodiments, a threshold number of nodes can be implemented in order to determine whether the logical path is condensable.

If the logical path is condensable, step 494 proceeds to step 496, where the ontology is modified to condense the logical path. This can include bypassing one or more nodes (e.g., by inferring functional relations which bypass the extraneous nodes) followed in the logical path to retrieve the asserted answer. For example, if 12 nodes are referenced in order to retrieve the asserted response, and 10 nodes are non-extraneous, and 2 nodes are extraneous, a new functional relation can be implemented to interrelate the 10 non-extraneous nodes in order to remove the 2 extraneous nodes from the logical path. If the logical path is not condensable, method 400 ends.

As an example of an asserted response with a condensable logic path, if the query "Where does Elon Musk live?" is received, and the original logic path taken to retrieve the response is "CEO→WorksFor→Company→HeadquarteredIn→Place→Has→Name," the logical path can be analyzed to determine whether it is condensable (e.g., by a domain expert, threshold comparison, AI analysis, etc.) (step 492). Based on the analysis, a determination can be made that the logical path to retrieve the place of Elon Musk's residence is condensable. In response to the determination that the logical path is condensable (step 494), one or more nodes can be bypassed in order retrieve the correct answer with greater efficiency (step 496). In this example, the logical path can be modified to bypass "WorksFor→Company→HeadquarteredIn" by drawing a new functional relation between "CEO" and "Place": "LivesIn." The new logical path to retrieve the correct response is then "CEO→LivesIn→Place→Has→Name," which yields Elon Musk's residence.

The aforementioned steps can be completed in any order and are not limited to those described. Additionally, some, all, or none of the aforementioned operations can be completed, while still remaining within the spirit and scope of the present disclosure. For example, in some embodiments, step 492 is not completed, as the logical path which yielded the asserted response is not analyzed.

Figure 5:
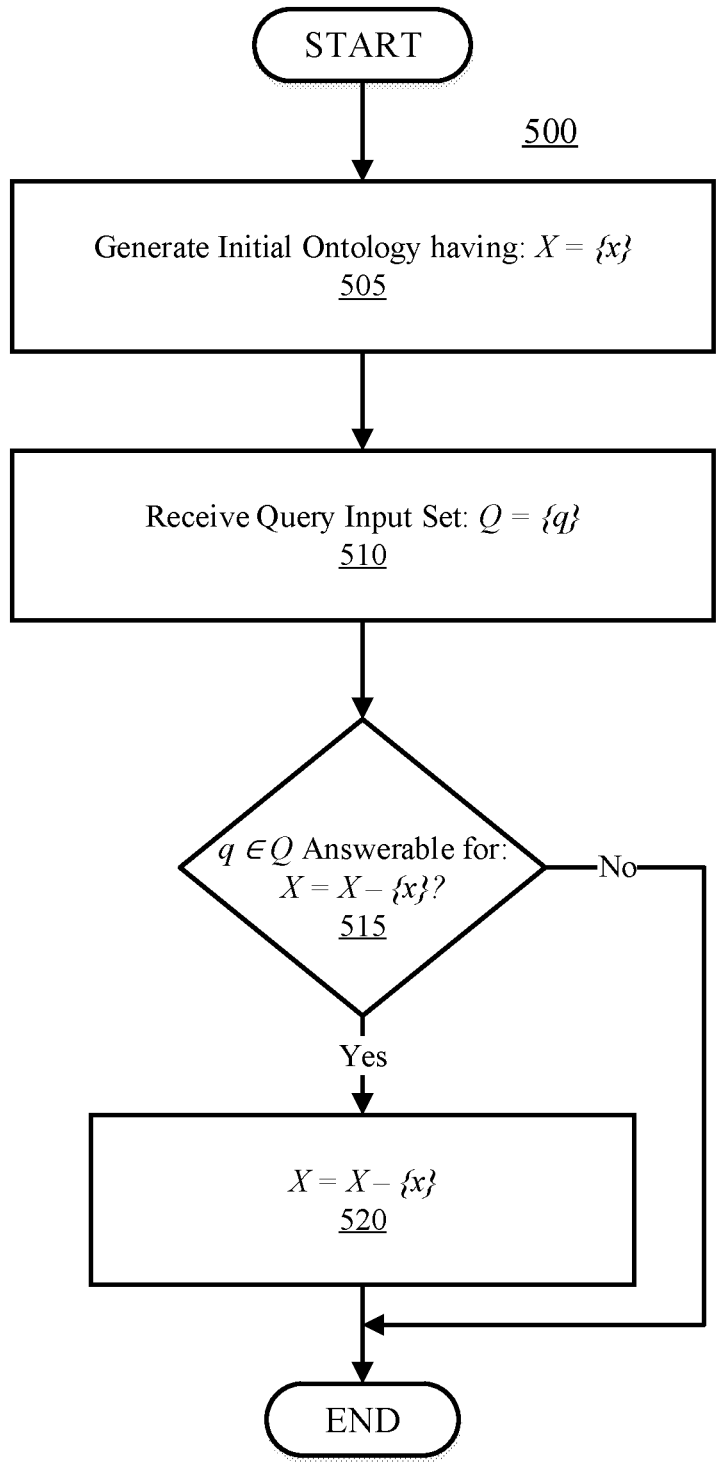
FIG. 5 is a flow diagram illustrating a process for pruning extraneous elements in an ontology, in accordance with embodiments of the present disclosure.

FIG. 5 is a flow diagram illustrating a process 500 for pruning extraneous elements in an ontology, in accordance with embodiments of the present disclosure. Process 500 beings by generating an initial ontology having X={x}, where X is a set of concepts C={c}, relations R={r} (e.g., hierarchical or functional relations), or attributes A={a}. This is illustrated at step 505. Each concept (c), relation (r), and attribute (a) collectively form the set of concepts C, set of relations R, and set of attributes A, respectively. The ontology can be populated with conventional techniques, such as ontology learning, clustering, machine learning, etc.

A query input set Q={q} is then received. This is illustrated at step 510. The query input can include a set of queries Q which an entity requests an answer (e.g., response) to. Afterwards, a determination is made regarding whether each q∈Q is answerable with X=X−{x}. This is illustrated at step 515. For every q∈Q which is answerable with X=X−{x}, then X=X−{x}. This is illustrated at step 520. If every q∈Q is not answerable when X=X−{x}, then process 500 ends, as the concepts (c), relations (r), or attributes (a) included in X are required to answer the question set.

As an example, if a concept (c) "4-Door Vehicle" is included in a concept set C (e.g., as a subclass of superclass "Vehicle"), and the queries collectively do not require the concept "4-Door Vehicle" in order to correctly answer the query set Q, then the concept (c) "4-Door Vehicle" can be removed, as it is extraneous to the question set. In this instance C=C−{c}, where (c) is the concept "4-Door Vehicle." By removing extraneous elements in the ontology X={x} which are not addressed in the question set, bandwidth and memory usage can be reduced. For example, the number of logical pathways parsed in order to retrieve the correct answer can be reduced. Further, the amount of memory which the ontological structure occupies can also be reduced.

Figure 6:
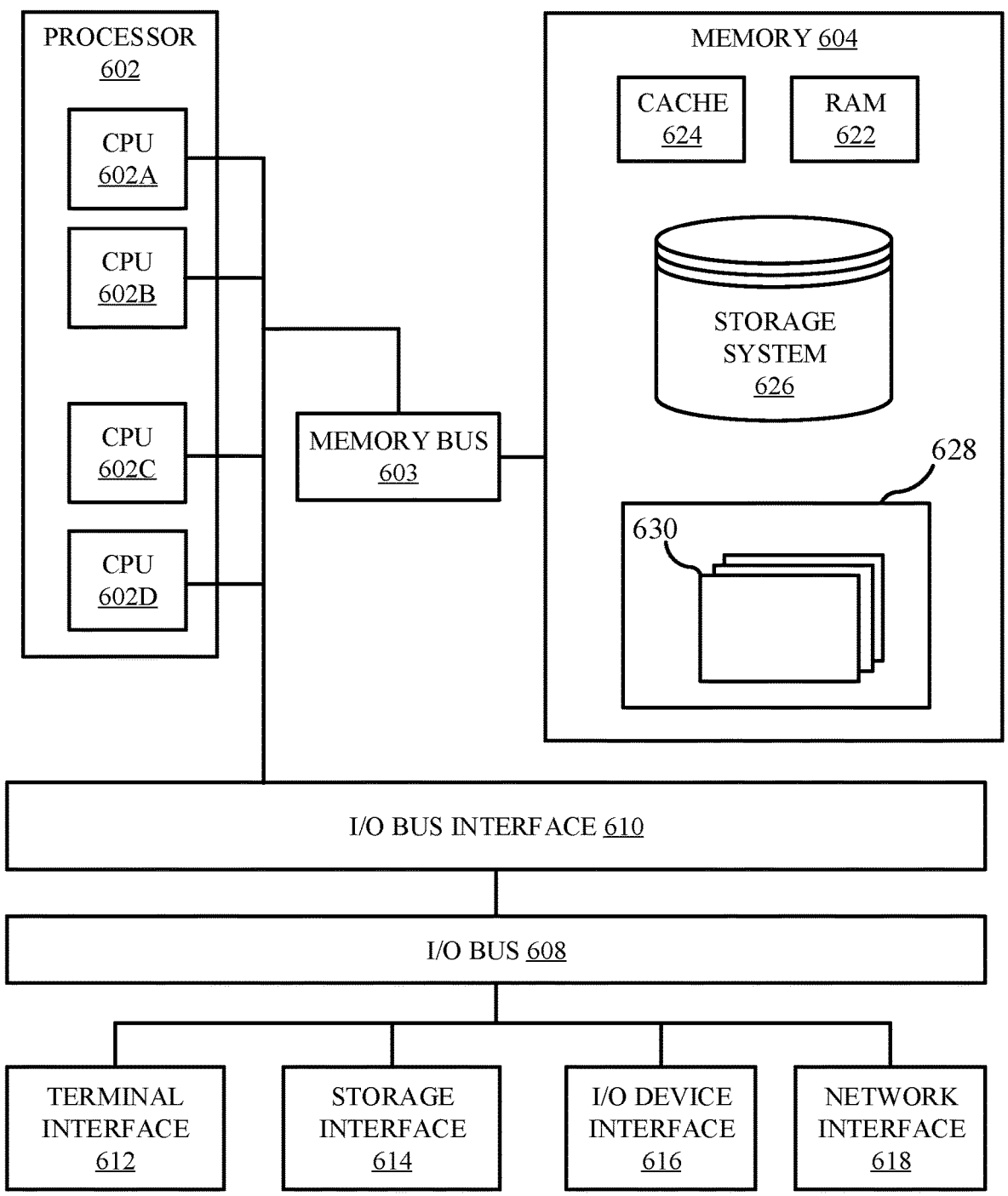
FIG. 6 is a high-level block diagram illustrating an example computer system that can be used in implementing one or more of the methods, tools, and modules, and any related functions, described herein, in accordance with embodiments of the present disclosure.

Referring now to FIG. 6, shown is a high-level block diagram of an example computer system 601 (e.g., devices 105, server 135, device 305, device 350, and ontology system 301) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 601 can comprise one or more CPUs 602, a memory subsystem 604, a terminal interface 612, a storage interface 616, an I/O (Input/Output) device interface 614, and a network interface 618, all of which can be communicatively coupled, directly or indirectly, for inter-component communication via a memory bus 603, an I/O bus 608, and an I/O bus interface unit 610.

The computer system 601 can contain one or more general-purpose programmable central processing units (CPUs) 602A, 602B, 602C, and 602D, herein generically referred to as the CPU 602. In some embodiments, the computer system 601 can contain multiple processors typical of a relatively large system; however, in other embodiments the computer system 601 can alternatively be a single CPU system. Each CPU 602 can execute instructions stored in the memory subsystem 604 and can include one or more levels of on-board cache.

System memory 604 can include computer system readable media in the form of volatile memory, such as random access memory (RAM) 622 or cache memory 624. Computer system 601 can further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 can include at least one program product having a set (e.g., at least one) of program modules that are configured to carry out the functions of various embodiments.

One or more programs/utilities 628, each having at least one set of program modules 630 can be stored in memory 604. The programs/utilities 628 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 628 and/or program modules 630 generally perform the functions or methodologies of various embodiments.

In some embodiments, the program modules 630 of the computer system 601 can include an ontology analysis and refinement module. The ontology analysis and refinement module application can be configured to complete one or more of the methods described for refining an ontology based on a query input and provided feedback. For example, the ontology analysis and refinement module can be configured to repair ontologies (e.g., correct deficiencies, add missing elements, condense logical pathways, prune extraneous elements) based on a query input and requested feedback.

Although the memory bus 603 is shown in FIG. 6 as a single bus structure providing a direct communication path among the CPUs 602, the memory subsystem 604, and the I/O bus interface 610, the memory bus 603 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 can, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices can be connected directly to one or more system I/O buses.

In some embodiments, the computer system 601 can be a multi-user mainframe computer system, a single-user system, or a server computer or similar device that has little or no direct user interface, but receives requests from other computer systems (clients). Further, in some embodiments, the computer system 601 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components can have greater or lesser complexity than as represented in FIG. 6, components other than or in addition to those shown in FIG. 6 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system comprising:
   at least one memory component; and
   at least one processor, wherein the at least one processor is configured to perform a method comprising:
   receiving, for an ontology, a query input;
   analyzing features of the query input, wherein analyzing features of the query input includes:
      determining syntactical and semantic characteristics for the features of the query input; and
      classifying, based on the determined syntactical and semantic characteristics, an ontological element for each feature of the query input, wherein the ontological element includes at least one selected from a group consisting of: a concept, a relation, and an attribute;
   comparing, the ontological element for each feature of the query input to a set of ontological elements of the ontology;
   retrieving, based on the comparison between each ontological element for each feature of the query input to the set of ontological elements of the ontology, a first response to the query input, wherein the first response indicates that the query input is unanswerable;
   extending, based on the comparison, the ontology such that the query input is answerable;
   retrieving, in response to the extending, a second response to the query input, wherein the second response is an answer to the query input;
   transmitting the second response and a request for feedback regarding the transmitted second response, wherein the feedback includes an assertion that the second response is a correct answer to the query or a negation that the second response is an incorrect answer to the query;
   receiving the negation indicating that the second response is the incorrect answer to the query;
   analyzing, based on the negation, the ontology to determine at least one deficiency of the ontology; wherein analyzing the ontology to determine the at least one deficiency of the ontology and wherein refining the ontology to correct the at least one deficiency includes:
      identifying a logical path executed to retrieve the second response, wherein the logical path includes a plurality nodes referenced in order to retrieve the second response;
      determining whether the logical path is condensable by identifying at least one extraneous node of the plurality of nodes that can be eliminated via interrelation of non-extraneous nodes of the plurality of nodes;
      condensing, in response to a determination that the logical path is condensable, the logical path by eliminating the at least one extraneous node and interrelating the non-extraneous nodes; and
      updating the ontology to include the condensed logical path; and
   refining, based on the at least one determined deficiency of the ontology, the ontology to correct the determined at least one deficiency.

2. The system of claim 1, wherein the method performed by the at least one processor further comprises:
   comparing, the ontological element for each feature of the query input to a set of ontological elements of the refined ontology;
   retrieving, based on the comparison between each ontological element for each feature of the query input to the set of ontological elements of the refined ontology, a third response to the query input; and transmitting the third response to the query input and a second request for feedback regarding the third response.

3. The system of claim 2, wherein the method performed by the at least one processor further comprises:

receiving feedback regarding the third response, wherein the feedback regarding the third response asserts that the third response is accurate; and determining, in response to the assertion that the second response is accurate, that the deficiency is properly repaired.

4. The system of claim 2, wherein the at least one deficiency is associated with an alias.

5. The system of claim 2, wherein the at least one deficiency is associated with a hierarchical relation.

6. The system of claim 2, wherein the at least one deficiency is associated with a functional relation between two concepts.

7. A computer implemented method for ontological refinement comprising:

receiving, for an ontology, a query input from a user;

analyzing, by a natural language processor, features of the query input, wherein analyzing features of the query input includes:

determining syntactical and semantic characteristics for the features of the query input; and classifying, based on the determined syntactical and semantic characteristics, an ontological element for each feature of query input, wherein the ontological element includes one of a concept, a relation, and an attribute;

comparing, the ontological element for each feature of the query input to a set of ontological elements of the ontology;

determining, based on the comparison between the ontological element for each feature of the query and the set of ontological elements of the ontology, that at least one element of the query input is missing from the ontology;

identifying, based on the determination that at least one feature of the query input is missing from the ontology, the at least one element of the query input that is missing from the ontology;

transmitting, in response to identifying the at least one element of the query input that is missing from the ontology, an error indication that the at least one element is missing;

refining the ontology to add the at least one element that is missing;

retrieving, using the refined ontology, a response to the query input, wherein the response is an answer to the query input;

requesting feedback regarding the response from the user;

receiving feedback regarding the response from the user, the feedback indicating the response is a correct answer to the query input; and determining that a logical path of the ontology followed to retrieve the correct answer is condensable; and condensing the logical path by removing one or more extraneous nodes not required to retrieve the correct answer.

8. The method of claim 7, further comprising:

generating a query regarding an ontological placement of the at least one element added to the ontology;

transmitting the query regarding the ontological placement of the at least one element added to the ontology;

receiving a response to the query regarding the ontological placement of the at least one element added to the ontology;

determining, in response to an assertion regarding the ontological placement of the at least one element as correct, that the ontology was accurately refined.

9. The method of claim 8, wherein the at least one element is a hierarchical relation.

10. The method of claim 8, wherein the at least one element is a concept.

11. The method of claim 8, wherein the at least one element is a functional relation.

12. The method of claim 8, wherein the at least one element is an alias.

13. A computer implemented method for ontological refinement comprising:

receiving, for an ontology, a query input;

analyzing, by a natural language processor, features of the query input, wherein analyzing features of the query input includes:

determining syntactical and semantic characteristics for the features of the query input; and classifying, based on the determined syntactical and semantic characteristics, an ontological element for each feature of query input, wherein the ontological element includes at least one selected from a group consisting of: a concept, a relation, and an attribute;

comparing, the ontological elements for each feature of the query input to a set of ontological elements of the ontology;

determining, based on the comparison between the ontological elements for each feature of the query and the set of ontological elements of the ontology, that the ontology includes at least one extraneous element of the set of ontology elements not included in the query input;

identifying, in response to the determination that the ontology includes at least one extraneous element of the set of ontology elements not included in the query input, the at least one extraneous element of the set of ontology elements not included in the query input;

refining, in response to identifying the at least one extraneous element, the ontology to remove the at least one extraneous element;

receiving a query input set including a plurality of query inputs;

removing at least one ontological element of the set of ontological elements from the ontology;

determining whether each query input of the query input set is answerable using the ontology; and removing, in response to determining that each query input of the query input set is answerable using the ontology, one or more additional ontological elements from the set of ontological elements from the ontology.

14. The method of claim 13, wherein the at least one extraneous element is a concept.

15. The method of claim 13, wherein the at least one extraneous element is a functional relation.

16. The method of claim 13, wherein the at least one extraneous element is an alias.

17. The method of claim 13, further comprising:

adding, in response to determining that each query input of the query input set is not answerable using the ontology, the at least one removed ontological element back to the ontology.

* * * * *